(12) United States Patent
Bratec et al.

(10) Patent No.: US 11,305,738 B2
(45) Date of Patent: Apr. 19, 2022

(54) WIPER ARM SPRAYING DEVICE

(71) Applicant: Robert Bosch GmbH, Stuttgart (DE)

(72) Inventors: Herve Bratec, Wilsele (BE); Adam Ugron, Budapest (HU); Zsofia Horvath, Balatonfuezfo (HU); Mate Hornyak, Pakozd (HU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/767,716

(22) PCT Filed: Oct. 17, 2018

(86) PCT No.: PCT/EP2018/078394
§ 371 (c)(1),
(2) Date: May 28, 2020

(87) PCT Pub. No.: WO2019/105647
PCT Pub. Date: Jun. 6, 2019

(65) Prior Publication Data
US 2021/0001817 A1     Jan. 7, 2021

(30) Foreign Application Priority Data
Nov. 28, 2017  (DE) .................... 10 2017 221 310.8

(51) Int. Cl.
*B60S 1/52*         (2006.01)
(52) U.S. Cl.
CPC .................... *B60S 1/522* (2013.01)
(58) Field of Classification Search
CPC .................................... B60S 1/522
See application file for complete search history.

(56) References Cited

U.S. PATENT DOCUMENTS

| | | | | |
|---|---|---|---|---|
| 6,393,652 | B1 * | 5/2002 | Vogt ................. | B60S 1/522 |
| | | | | 15/250.01 |
| 2007/0143947 | A1 * | 6/2007 | Harita ............... | B60S 1/524 |
| | | | | 15/250.04 |
| 2016/0121853 | A1 * | 5/2016 | Uchiyama ......... | B60S 1/3468 |
| | | | | 15/250.04 |
| 2017/0232938 | A1 * | 8/2017 | Picot ................ | B60S 1/3436 |
| | | | | 15/250.04 |

FOREIGN PATENT DOCUMENTS

| | | |
|---|---|---|
| DE | 19912975 | 9/2000 |
| DE | 102011114722 A1 | 4/2013 |
| DE | 102013209196 | 11/2014 |
| DE | 102015216699 | 3/2017 |
| DE | 102016214577 A1 | 2/2018 |
| EP | 3115265 | 1/2017 |
| FR | 2781743 | 2/2000 |
| JP | 2011149545 A | 8/2011 |

OTHER PUBLICATIONS

International Search Report for Application No. PCT/EP2018/078394 dated Jan. 15, 2019 (English Translation, 2 pages).

* cited by examiner

*Primary Examiner* — Andrew A Horton
(74) *Attorney, Agent, or Firm* — Michael Best & Friedrich LLP

(57) ABSTRACT

The invention relates to a wiper arm spraying device (10a; 10b) for coupling to a wiper arm (12a; 12b), comprising at least one valve unit (14a; 14b) which is designed to supply a nozzle unit (16a; 16b) with wiper fluid. According to the invention, the valve unit (14a; 14b) is designed for integration into a wiper arm tube unit (18a; 18b).

18 Claims, 6 Drawing Sheets

WIPER ARM SPRAYING DEVICE

BACKGROUND OF THE INVENTION

A wiper arm spraying device for coupling to a wiper arm, comprising at least one valve unit which is provided for supplying a nozzle unit with wiper fluid has already been proposed.

SUMMARY OF THE INVENTION

The invention is based on a wiper arm spraying device for coupling to a wiper arm, comprising at least one valve unit which is provided for supplying a nozzle unit with wiper fluid.

It is proposed that the valve unit is provided to be integrated in a wiper arm hose unit. The valve unit is preferably arranged between two wiper arm hose elements of the wiper arm hose unit. The valve unit is preferentially coupled at opposite ends to one of the wiper arm hose elements in each case. A wiper arm hose element of the wiper arm unit is preferably arranged between the valve unit and the nozzle unit. The wiper arm hose unit particularly preferentially forms part of the wiper arm spraying device. In addition, the valve unit preferably serves as a hose holder.

In this context, a "wiper arm spraying device" is intended to be understood as meaning in particular a device which is provided for arranging on a wiper arm. This is intended preferably to be understood as meaning in particular a device which is provided in at least one operating state for cleaning a vehicle window to conduct wiper fluid to a wiper arm and to apply said wiper fluid to a vehicle window. Furthermore, in this context, a "valve unit" is intended to be understood as meaning in particular a unit which comprises at least one valve and/or at least one valve component. This is preferably intended to be understood as meaning a unit which is provided for controlling and/or regulating a flow of fluids, in particular liquids, particularly preferentially wiper fluid. This is particularly preferentially intended to be understood as meaning a unit which is provided to control and/or regulate a flow quantity, a flow direction and/or a general flow. In this context, a "nozzle unit" is intended to be understood as meaning in particular a unit which comprises at least one nozzle element. The nozzle unit preferentially comprises at least two nozzle elements. In this context, a "nozzle element" is intended to be understood as meaning in particular an element which is provided to discharge wiper fluid or to spray same in a certain direction. In particular, the nozzle element has at least one nozzle opening which opens a washing water system toward an environment. The nozzle element can be produced from a metal and/or particularly advantageously from a plastic. The nozzle element is preferentially provided to be coupled to a wiper arm hose element of the wiper arm hose unit.

In this context, a "wiper arm hose unit" is intended to be understood as meaning in particular a unit which is provided for conducting wiper fluid. The unit is preferably provided at least to conduct wiper fluid from a pump and/or a wiper fluid tank to the valve unit and/or to conduct wiper fluid from the valve unit to the nozzle unit. The wiper arm hose unit preferentially comprises at least one wiper arm hose element forming a liquid channel. The wiper arm hose element can be formed here both by a flexible hose and by a dimensionally fixed tube. Various designs of the wiper arm hose element appearing expedient to a person skilled in the art are conceivable. In principle, it would also be conceivable for the wiper arm hose element to be formed by a recess introduced in a further component, such as, for example, in a wiper rod of the wiper arm. Furthermore, in this context, "integrated" is intended to be understood as meaning in particular that the valve unit is integrated at least in terms of flow in the wiper arm hose unit, i.e. in particular wiper fluid flows at least temporarily through the valve unit during flow through the wiper arm hose unit. This is preferably intended to be understood as meaning in particular an arrangement of the valve unit, in which wiper fluid flows in at least one operating state in particular first of all through the wiper arm hose unit, then through the valve unit and then through the wiper arm hose unit again. This is particularly preferentially intended to be understood as meaning in particular that the valve unit is arranged between two wiper arm hose elements of the wiper arm hose unit and is coupled in particular in each case at opposite ends to one of the wiper arm hose elements in each case.

The configuration according to the invention of the wiper arm spraying device makes it possible to achieve in particular an advantageously compact arrangement of the valve unit. In particular, an arrangement of the valve unit spaced apart from the nozzle unit can be achieved. The wiper arm spraying device can preferably be formed in an advantageously compact and in particular flat manner. This makes it possible to provide in particular advantageous aerodynamics of the wiper arm spraying device. In particular, an advantageous wiping behavior can be achieved, in particular even at high speeds. Furthermore, an advantageous hydraulic behavior can be achieved overall.

Furthermore, it is proposed that the wiper arm spraying device has a nozzle unit which is provided for applying wiper fluid to a vehicle window, wherein the valve unit has a housing which is formed separately from a housing of the nozzle unit. The valve unit and the nozzle unit are preferably connected at least in terms of flow merely via a wiper arm hose element of the wiper arm hose unit. The housing of the valve unit is provided in particular at least for receiving a valve of the valve unit. The housing of the valve unit is preferably formed by a plastics housing. The housing of the valve unit is provided in particular at least for receiving and/or for mounting the nozzle elements of the nozzle unit. The housing of the nozzle unit is preferably formed from a plastics housing. As a result, in particular an advantageous separated arrangement of the valve unit and the nozzle unit can be achieved. In particular, an arrangement of the valve unit spaced apart from the nozzle unit can be achieved. The valve unit can thereby be preferably particularly advantageously arranged in a space-saving manner.

Furthermore, it is proposed that the valve unit has at least one coupling element which is provided for coupling the valve unit to a wiper rod of the wiper arm. The coupling element is preferably provided for fastening the valve unit to the wiper rod of the wiper arm. The coupling element is preferentially provided in particular at least for fixing the valve unit to the wiper rod in a form-fitting manner. The coupling element is particularly preferentially provided to engage around the wiper rod at least for a large part, i.e. in particular over at least 50%, preferably over at least 60% and particularly preferentially over at least 80% of a circumference. In this context, a "coupling element" is intended to be understood as meaning in particular an element which is provided for fixing an associated unit to a further component. The coupling element is preferably provided for direct connection to a further component. A connection can take place here, for example, by engaging around, engaging, latching and/or screwing. However, in principle, other connecting methods, in particular at least form-fitting connecting methods, appearing expedient to a person skilled in the art are also conceivable. As a result, in particular, an advantageous attachment of the valve unit to the wiper arm can be achieved. In particular, an advantageous direct attachment can be achieved. The valve unit can preferably thereby be fastened advantageously to a compact wiper rod, as a result of which an overall height of the wiper arm is increased only slightly, if at all.

In addition, it is proposed that the coupling element of the valve unit is formed integrally with the housing of the valve unit. The coupling element is preferably molded onto the housing of the valve unit. The housing of the valve unit particularly preferentially forms at least a partial region of a receiving region for receiving the wiper rod of the coupling element. "Integrally" is intended to be understood as meaning in particular connected at least in an integrally bonded manner, for example by means of a welding process, an adhesive bonding process, an injection molding process and/or another process appearing expedient to a person skilled in the art, and/or advantageously is intended to be understood as meaning shaped in one piece, such as, for example, by production from a casting and/or by production in a single- or multi-component injection molding process and advantageously from an individual blank. In particular, an advantageously secure installation can thereby be achieved. Furthermore, in particular, components can be kept low in number. In particular, an advantageously compact valve unit can be provided.

It is furthermore proposed that the nozzle unit has at least one coupling element which is provided for coupling the nozzle unit to a wiper arm adapter of the wiper arm. The coupling element is preferably provided to fasten the nozzle unit to the wiper arm adapter of the wiper arm. The coupling element is preferentially provided in particular at least for fixing the nozzle unit to the wiper arm adapter in a form-fitting manner. The coupling element is particularly preferentially provided to engage in a recess, in particular a groove, of the wiper arm adapter. In this context, a "wiper arm adapter" is intended to be understood as meaning in particular an adapter which has a contact region with a wiper arm component, in particular the wiper arm, and is connected captively to the wiper arm component and is provided to provide a coupling region of the wiper arm component for coupling and/or contact connection with a wiper blade adapter. In particular, an advantageous attachment of the nozzle unit to the wiper arm can thereby be achieved. Furthermore, in particular an advantageous, in particular central, arrangement of the nozzle unit can thereby be achieved. By separation of the nozzle unit from the valve unit, the nozzle unit can particularly advantageously be formed compactly and aerodynamically.

It is furthermore proposed that the coupling element of the nozzle unit is formed by a fixing rib which is provided to engage in a fixing groove of the wiper arm adapter of the wiper arm. The fixing rib is preferably formed by a dovetail fixing rib which has a dovetail-shaped cross section. The fixing groove is particularly preferentially formed by a dovetail fixing groove which likewise has a dovetail-shaped cross section. During installation, the nozzle unit is preferentially pushed parallel to a main direction of extent of the fixing rib onto the wiper arm adapter. In this connection, a "fixing rib" is intended to be understood as meaning in particular a rib forming a tongue of a tongue and groove connection. The rib is preferably provided to at least partially engage in a form-fitting manner in a groove, in particular a fixing groove. The fixing groove particularly preferentially forms an undercut, behind which the fixing rib engages. The fixing rib can preferably therefore be pushed merely parallel to a main direction of extent of the fixing rib into the fixing groove. In particular, a connection which is advantageously secure and above all is easy to produce between the nozzle unit and the wiper arm adapter can thereby be provided.

Furthermore, it is proposed that the nozzle unit has at least one further coupling element which is provided for coupling the nozzle unit to a wiper rod of the wiper arm. The further coupling element is preferably provided to fasten the nozzle unit to the wiper rod of the wiper arm. The further coupling element is preferentially provided in particular at least for fixing the nozzle unit to the wiper rod in a form-fitting manner. The further coupling element is particularly preferentially provided to engage around the wiper rod at least for a large part, i.e. in particular over at least 50%, preferably over at least 60% and particularly preferentially over at least 80% of a circumference. The further coupling element is preferentially formed integrally with the housing of the nozzle unit. The further coupling element is preferably molded onto the housing of the nozzle unit. As a result, in particular, a further additional attachment of the nozzle unit to the wiper arm can be provided. In particular, an advantageously secure attachment of the nozzle unit can be provided.

Furthermore, it is proposed that the valve unit comprises at least one valve in the form of a duckbill valve. In this context, a "duckbill valve" is intended to be understood as meaning in particular a valve which is shaped like a duck's bill. The valve preferably has, on an inlet side, an annular cross section which flattens toward an outlet side and merges into an at least approximately rectangular cross section. In a relaxed state of the valve, an upper side and a lower side of the rectangular cross section lie in particular against each other such that the valve is closed. The flattened end of the valve particularly preferentially opens when a fluid is pumped on an inlet side into the valve, in order to allow the pressurized fluid to pass. If, however, the pressure is removed, the flattened end returns to its flattened rectangular shape, thereby preventing a backflow. The valve is preferably composed of a rubber or a synthetic elastomer. In principle, however, other materials and/or material combinations are also conceivable. In particular, an advantageously compact and reliable valve can thereby be provided.

Furthermore, the invention is based on a system comprising a wiper arm and comprising a wiper arm spraying device. It is proposed that in a mounted state of the nozzle unit, a shape of a housing of a nozzle unit of the wiper arm spraying device at least partially merges into a shape of a wiper arm adapter of the wiper arm. The housing of the nozzle unit preferably has at least one surface in a transition region, in which the nozzle unit is adjacent to the wiper arm adapter, said surface extending in the transition region parallel to an adjacent surface of the wiper arm adapter. A vertical offset between the nozzle unit and the wiper arm adapter is preferentially less than 6 mm, preferably less than 4 mm and particularly preferentially less than 2 mm. In particular, advantageous aerodynamics can thereby be provided. Furthermore, a uniform and harmonious appearance can be provided. In particular, an advantageous integration of the nozzle unit into an aerodynamic design of the system, in particular of the wiper arm, can preferably be achieved. The nozzle unit preferably does not cause an increase in the height of the system in relation to a height of the wiper arm, in particular the wiper arm adapter. An aerodynamic effect of the nozzle unit can be kept small.

Furthermore, it is proposed that the nozzle unit of the wiper arm spraying device is at least partially formed integrally with the wiper arm adapter of the wiper arm. The nozzle unit of the wiper arm spraying device is preferably attached fixedly to the wiper arm adapter of the wiper arm. The nozzle unit and the wiper arm adapter are preferentially jointly coupled to a wiper rod of the wiper arm. Alternatively, it would therefore also be conceivable for the nozzle unit and the wiper arm adapter to merely form an assembly. As a result, in particular, an advantageously simple and rapid installation can be achieved. Furthermore, a reliable arrangement of the nozzle unit can be achieved. Components can furthermore be kept low in number.

It is furthermore proposed that the valve unit of the wiper arm spraying device is arranged upstream of the wiper arm adapter in the flow direction. The valve unit of the wiper arm spraying device is preferably arranged upstream of the wiper arm adapter in the flow direction of the wiper fluid. The valve unit of the wiper arm spraying device is particularly preferentially arranged on a wiper rod of the wiper arm. As a result, in particular, an advantageously compact arrangement of the valve unit can be achieved.

It is furthermore proposed that a minimum distance between the valve unit and the wiper arm adapter is at least 1 cm. A minimum distance between the valve unit and the wiper arm adapter is preferably at least 2 cm, preferably at least 3 cm and particularly preferentially at least 4 cm. As a result, in particular, an advantageously spaced-apart arrangement of the valve unit from the wiper arm adapter can be achieved. A high degree of compactness in the region of the wiper arm adapter can thereby be achieved in turn. An advantageously flat system in particular overall can be provided. Advantageous aerodynamics can thereby be achieved.

The wiper arm spraying device according to the invention and the system are not intended to be limited here to the application and embodiment described above. In particular, the wiper arm spraying device according to the invention and the system can have a number of individual elements, components and units differing from a number mentioned here, for carrying out a manner of operation described here. In addition, in the ranges of values indicated in this disclosure, values lying within the limits mentioned are also intended to be considered to be disclosed and usable as desired.

BRIEF DESCRIPTION OF THE DRAWINGS

Further advantages emerge from the description below of the drawing. The drawing illustrates two exemplary embodiments of the invention. The drawing, the description and the claims contain numerous features in combination. A person skilled in the art will expediently also consider the features individually and combine them to form meaningful further combinations.

In the drawing.

DETAILED DESCRIPTION

Figure 1:
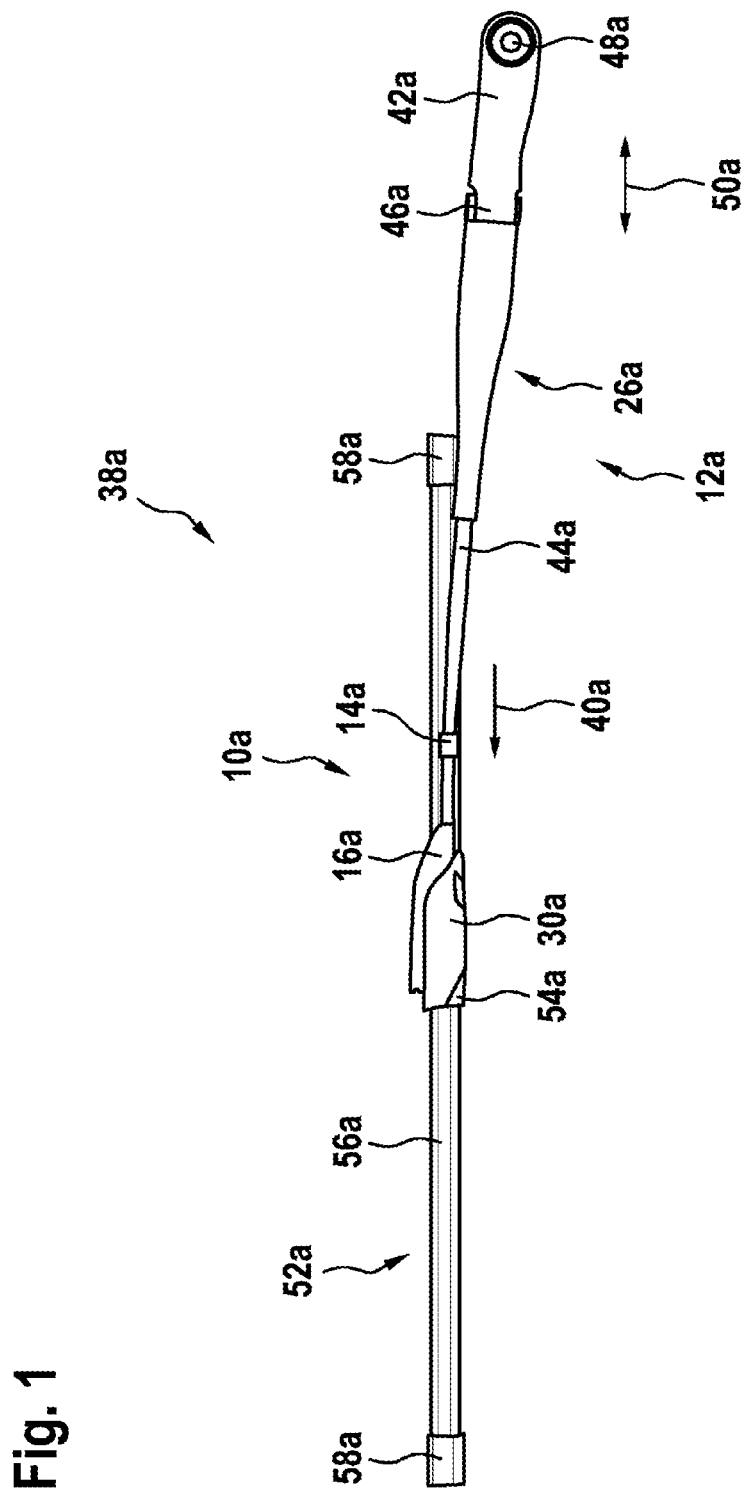
FIG. 1 shows a system comprising a wiper arm and comprising a wiper arm spraying device according to the invention which has a valve unit and a nozzle unit, and a wiper blade in a schematic illustration.

FIG. 1 shows a system 38a comprising a wiper arm 12a and comprising a wiper arm spraying device 10a. Furthermore, FIG. 1 shows a wiper blade 52a which is coupled to the wiper arm 12a.

The wiper arm 12a has a wiper rod 26a. The wiper rod 26a has two wiper arm segments 42a, 44a and a hinge 46a. The wiper arm segments 42a, 44a are connected via the hinge 46a. Furthermore, a spring element, not specifically visible, is arranged in the region of the hinge 46a. The spring element which is not specifically visible is provided to press the second wiper arm segment 44a in the direction of a vehicle window in a pressing region of the second wiper arm segment 44a. The first wiper arm segment 42a is connected via an axle 48a to the motor vehicle, not specifically visible. The axle 48a, as viewed along a main direction of extent 50a of the wiper arm 12a, is connected to the wiper rod 26a at an outer end of the wiper arm 12a. The axle 48a is driven by a drive motor, not specifically visible. A wiper arm adapter 30a is arranged at an end of the second wiper arm segment 44a that faces away from the hinge 46a. The wiper arm adapter 30a is provided for receiving a wiper blade adapter 54a of the wiper blade 52a. The wiper arm adapter 30a receives the wiper blade adapter 54a.

The wiper blade 52a has the wiper blade adapter 54a. The wiper blade 52a has the wiper blade adapter 54a for coupling to the wiper arm 12a. Furthermore, the wiper blade 52a has a wing deflector unit 56a, two spring rails, not specifically visible, a wiper lip, not specifically visible, and two end caps 58a, of which only one is visible. In an operating state, the wiper blade 52a wipes over the vehicle window. The wiper lip, not specifically visible, of the wiper blade 52a is provided in order, during a wiping operation state, to lie against the vehicle window and to wipe over the latter. The wiper lip, not specifically visible, is held in the wind deflector unit 56a via the spring rails, not specifically visible. In principle, another design of the wiper blade 52a appearing expedient to a person skilled in the art would, however, also be conceivable. For example, it would be conceivable for the wind deflector unit 56a and the wiper lip, not specifically visible, to be formed integrally.

The wiper arm spraying device 10a is provided for cleaning the vehicle window. The wiper arm spraying device 10a is provided for applying and/or distributing wiper fluid to the vehicle window for cleaning purposes. Furthermore, the wiper arm spraying device 10a is provided for coupling to the wiper arm 12a. The wiper arm spraying device 10a has a valve unit 14a. Furthermore, the wiper arm spraying device 10a has a nozzle unit 16a.

The valve unit 14a is provided for supplying the nozzle unit 16a with wiper fluid. The valve unit 14a comprises a valve 36a. The valve unit 14a comprises a valve 36a in the form of a duckbill valve. In principle, another design of the valve 36a appearing expedient to a person skilled in the art would, however, also be conceivable. The valve 36a is provided to prevent a backflow of the wiper fluid after a spraying operation is ended. The valve 36a serves as a type of nonreturn valve. In addition, it would be conceivable for a flow to be controlled via the valve 36a. The valve unit 14a is formed by a separate constructional unit. The valve unit 14a has a housing 20a. The housing 20a is formed by a separate housing assigned to the valve unit 14a. The housing 20a is formed by a plastics housing. Furthermore, the housing 20a receives the valve 36a.

Figure 4:
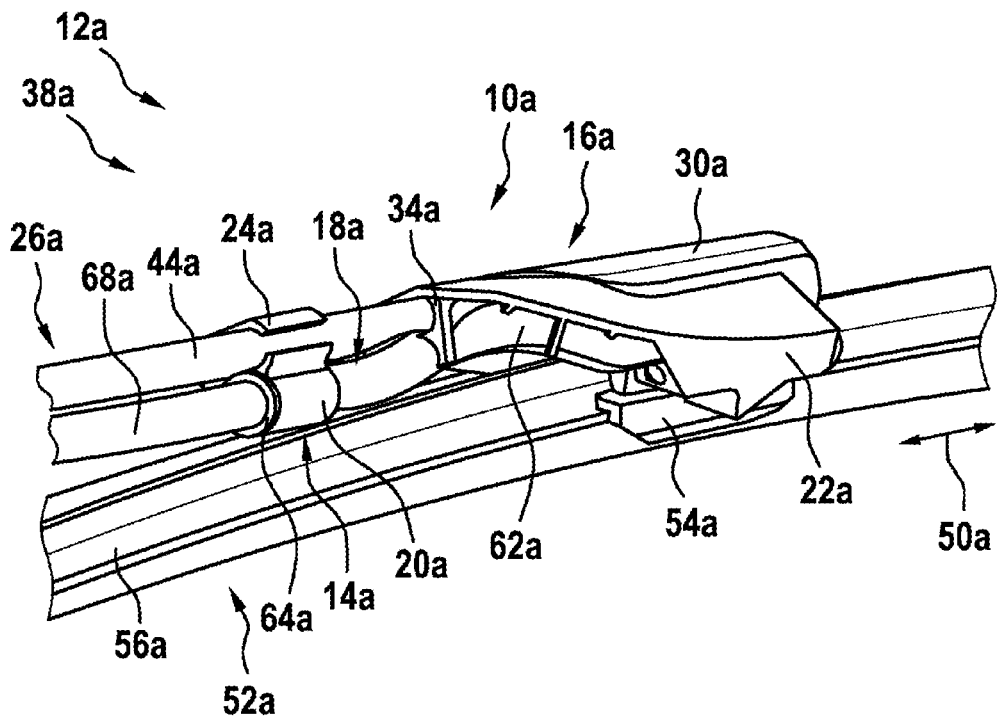
FIG. 4 shows a partial detail of the system comprising the wiper arm and comprising the wiper arm spraying device according to the invention, and the wiper blade in a schematic side view.
Figure 6:
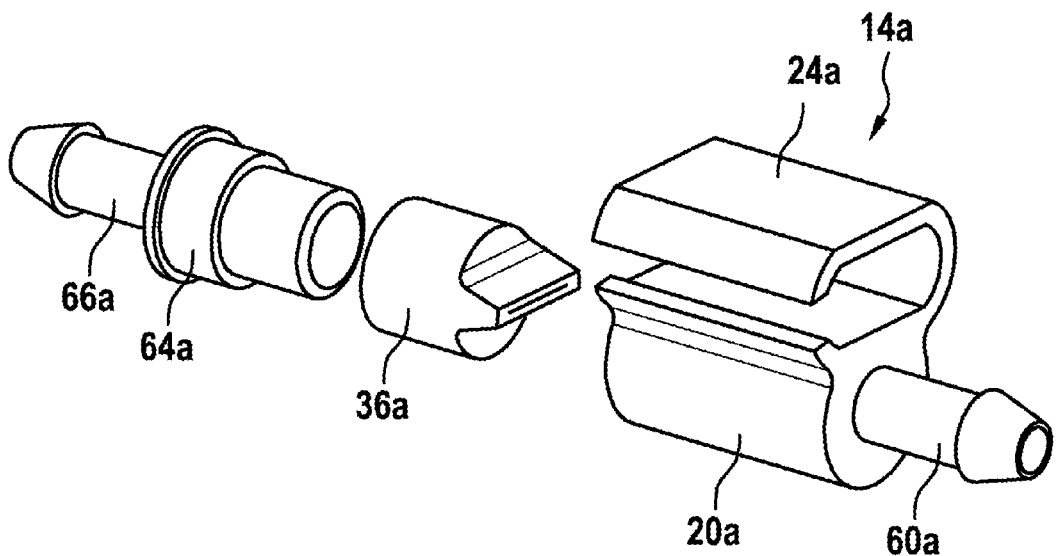
FIG. 6 shows the valve unit of the wiper arm spraying device according to the invention in a schematic exploded illustration.

The housing 20a has a receiving region, not specifically visible, in which the valve 36a is received. In addition, the receiving region of the housing 20a forms a channel for conducting the wiper fluid within the valve unit 14a. Furthermore, the housing 20a has a connection piece 60a which opens into the receiving region and is provided for connecting a wiper arm hose element 62a. The connecting piece 60a forms an outlet side of the valve unit 14a. Furthermore, the valve unit 14a has an end cap 64a. The end cap 64a is arranged on a side of the receiving region facing the connection piece 60a and serves for closing the receiving region. Furthermore, the end cap 64a is provided for partially receiving the valve 36a. The valve 36a is plugged onto the end cap 64a at an end of the end cap 64a that protrudes into the receiving region. The end cap 64a is plugged into the receiving region of the housing 20a. Furthermore, the end cap 64a likewise has a connection piece 66a which opens into the receiving region and is provided for connecting a wiper arm hose element 68a. The connection piece 66a forms an inlet side of the valve unit 14a (FIGS. 4 and 6).

The valve unit 14a is provided to be integrated in a wiper arm hose unit 18a. The wiper arm hose unit 18a has the wiper arm hose elements 62a, 68a. The valve unit 14a is arranged between the wiper arm hose elements 62a, 68a and the wiper arm hose unit 18a. The valve unit 14a is connected between the wiper arm hose elements 62a, 68a (FIGS. 4 and 6).

Furthermore, the valve unit 14a has a coupling element 24a. The coupling element 24a is provided for coupling the valve unit 14a to a wiper rod 26a of the wiper arm 12a. The coupling element 24a is formed by a clip. The coupling element 24a is formed by a C-shaped clip which is provided for engaging around the wiper rod 26a of the wiper arm 12a. For this purpose, the coupling element 24a forms a receiving region for receiving the wiper rod 26a. The coupling element 24a is provided for coupling to the second wiper arm segment 44a. The coupling element 24a of the valve unit 14a is formed integrally with the housing 20a of the valve unit 14a. The housing 20a of the valve unit 14a forms a partial region of the receiving region for receiving the wiper rod 26a of the coupling element 24a. An upper side of the housing 20a is directly adjacent to the receiving region of the coupling element 24a (FIGS. 4 and 6).

In addition, the valve unit 14a serves as a tube holder which fastens the wiper arm hose unit 18a to the wiper rod 26a. The valve unit 14a therefore connects the function of a tube holder and a valve.

Figure 5:
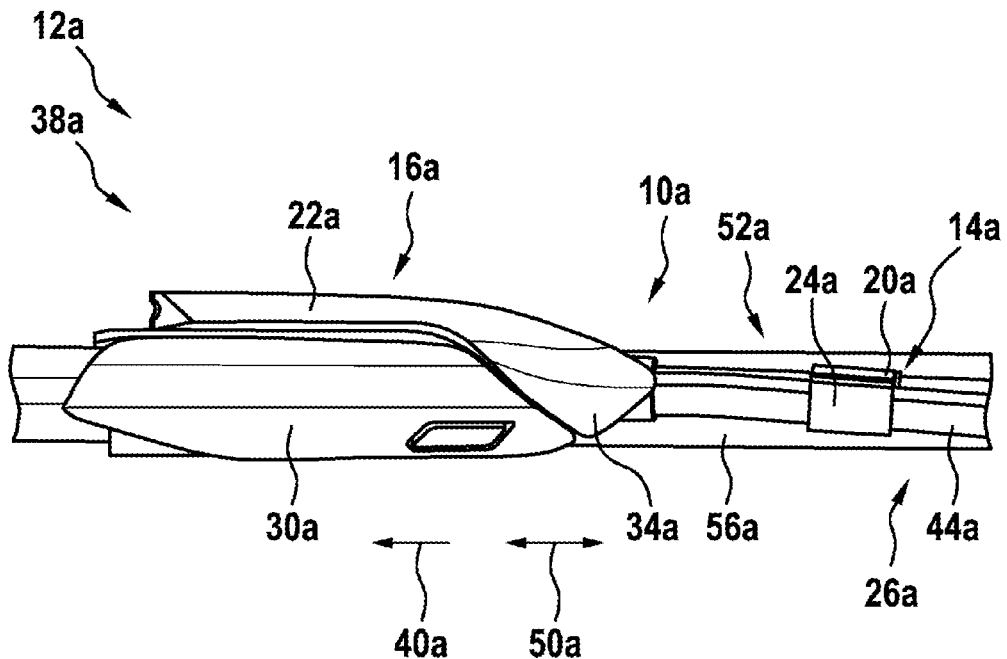
FIG. 5 shows a partial detail of the system comprising the wiper arm and comprising the wiper arm spraying device according to the invention, and the wiper blade in a schematic top view.

The valve unit 14a of the wiper arm spraying device 10a is arranged upstream of the wiper arm adapter 30a in the flow direction 40a. The valve unit 14a of the wiper arm spraying device 10a is arranged on the wiper rod 26a upstream of the wiper arm adapter 30a in the flow direction 40a. A minimum distance between the valve unit 14a and the wiper arm adapter 30a is at least 1 cm, preferably at least 2 cm, preferentially at least 3 cm and particularly preferentially at least 4 cm. A minimum distance between the valve unit 14a and the wiper arm adapter 30a can preferably be varied. As the distance increases, on the one hand, in particular an action or reaction speed of the valve 36a is worse and, on the other hand, a compact arrangement is improved (FIG. 5).

Figure 2:
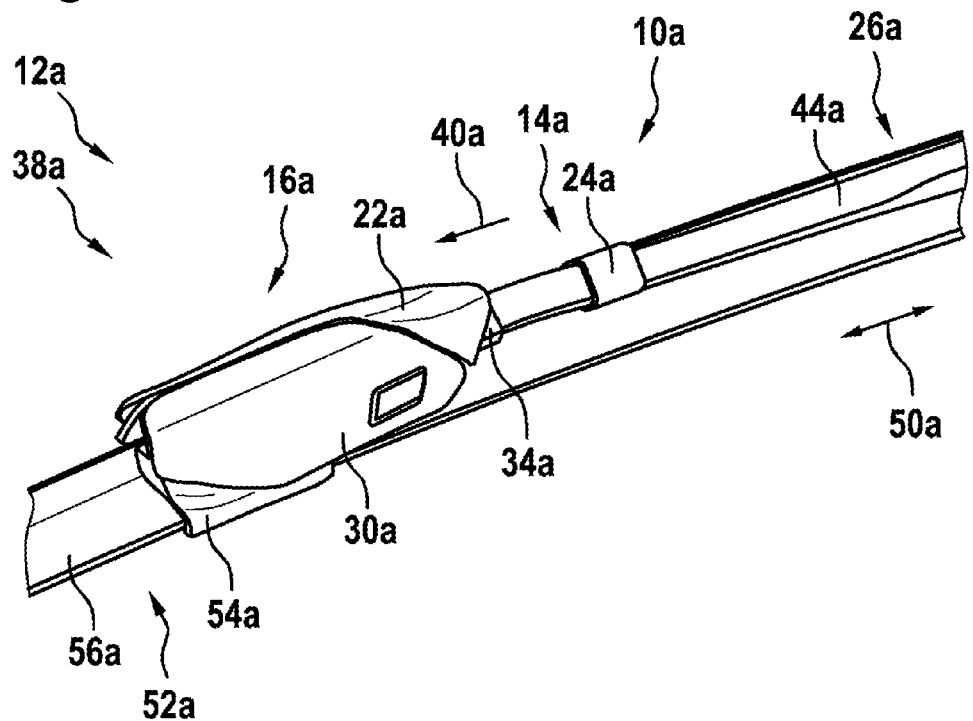
FIG. 2 shows a partial detail of the system with the wiper arm and with the wiper arm spraying device according to the invention and the wiper blade in a schematic top view.
Figure 3:
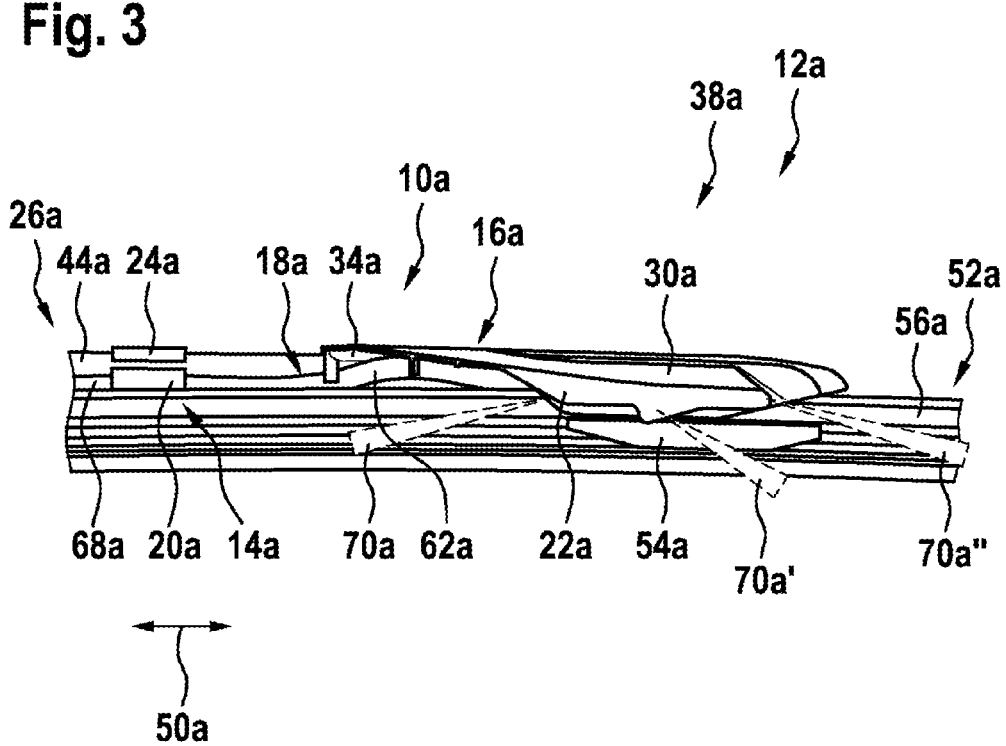
FIG. 3 shows a partial detail of the system comprising the wiper arm and comprising the wiper arm spraying device according to the invention, and the wiper blade in a schematic side view.

The nozzle unit 16a is provided for applying wiper fluid to a vehicle window. The nozzle unit 16a is provided for directly applying wiper fluid to a vehicle window. For this purpose, the nozzle unit 16a has a plurality of nozzles, not specifically visible, which are provided for distributing the wiper fluid. In principle, it would also be conceivable for the nozzle unit 16a to merely have one nozzle. The nozzle unit 16a has by way of example three nozzles which are each provided for producing a wiper fluid jet 70a, 70a', 70a''. The nozzle unit 16a furthermore has a housing 22a in which the nozzles are received. The housing 22a is formed by a separate housing. The housing 20a of the valve unit 14a is formed separately from the housing 22a of the nozzle unit 16a. The housing 22a of the nozzle unit 16a furthermore has a connection, not specifically visible, for connecting the wiper arm hose unit 18a. The connection serves for connecting the wiper arm hose element 62a which is also coupled to an outlet side of the valve unit 14a. The wiper arm hose element 62a is coupled at a first end to the valve unit 14a and at a second end to the nozzle unit 16a. The wiper arm hose element 62a is partially guided in the housing 22a of the nozzle unit 16a. The housing 22a of the nozzle unit 16a is formed by a plastics housing. The housing 20a is provided to partially engage around a side of the wiper arm adapter 30a and to lie against the latter. A side of the housing 20a facing the wiper arm adapter 30a is adapted to a shape of the wiper arm adapter 30a. In a mounted state, the nozzle unit 16a is arranged directly adjacent to the wiper arm adapter 30a. In a mounted state of the nozzle unit 16a, a shape of the housing 22a of a nozzle unit 16a of the wiper arm spraying device 10a partially merges into a shape of a wiper arm adapter 30a of the wiper arm 12a. The housing 22a of the nozzle unit 16a has at least one surface in a transition region, in which the nozzle unit 16a is adjacent to the wiper arm adapter 30a, which surface extends in the transition region parallel to an adjacent surface of the wiper arm adapter 30a. Furthermore, a vertical offset between the nozzle unit 16a and the wiper arm adapter 30a is less than 2 mm. Furthermore, the nozzle unit 16a is arranged on a wind-remote side of the wiper arm adapter 30a, in particular starting from a wiper arm 12a in an inoperative position, when a headwind acts head-on. A highest point of the nozzle unit 16a is furthermore lower than a highest point of the wiper arm adapter 30a (FIGS. 2, 3 and 4).

Figure 8:
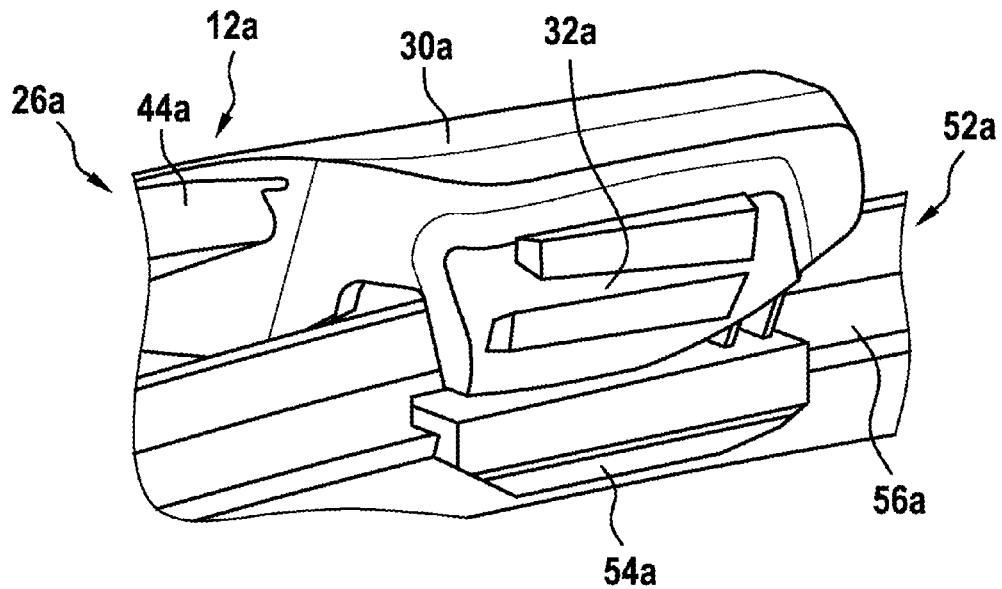
FIG. 8 shows a wiper arm adapter of the wiper arm of the system in a schematic illustration.
Figure 9:
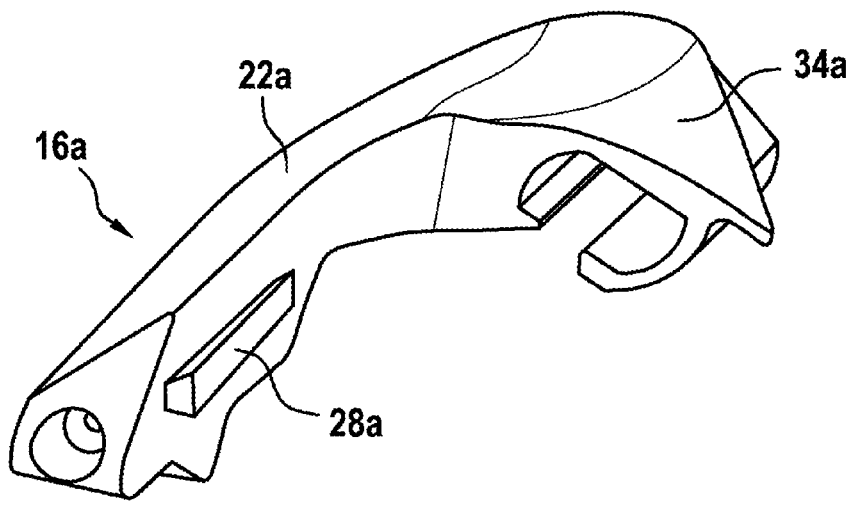
FIG. 9 shows the nozzle unit of the wiper arm spraying device according to the invention in a schematic illustration.
Figure 10:
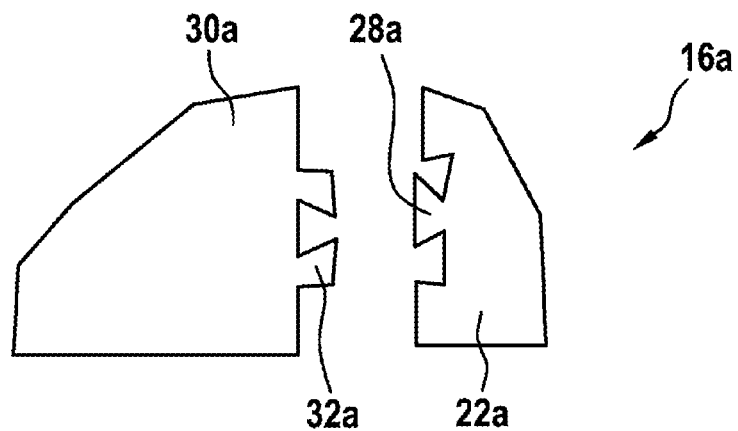
FIG. 10 shows the wiper arm adapter of the wiper arm and the nozzle unit of the wiper arm spraying device according to the invention in a schematic sectional illustration.

Furthermore, the nozzle unit 16a has a coupling element 28a which is provided for coupling the nozzle unit 16a to a wiper arm adapter 30a of the wiper arm 12a. The coupling element 28a is provided to fasten the nozzle unit 16a to the wiper arm adapter 30a of the wiper arm 12a. The coupling element 28a is provided for fixing the nozzle unit 16a to the wiper arm adapter 30a in a form-fitting manner. The coupling element 28a of the nozzle unit 16a is arranged on the housing 22a of the nozzle unit 16a. The coupling element 28a is formed integrally with the housing 22a of the nozzle unit 16a. The coupling element 28a of the nozzle unit 16a is formed by a fixing rib which is provided to engage in a fixing groove 32a of the wiper arm adapter 30a of the wiper arm 12a. The fixing rib is formed by a dovetail fixing rib which has a dovetail-shaped cross section. In principle, another shaping of the fixing rib appearing expedient to a person skilled in the art would, however, also be conceivable. The fixing groove 32a of the wiper arm adapter 30a is arranged on an outer side of the wiper arm adapter 30a. The fixing groove 32a is formed by a dovetail fixing groove which likewise has a dovetail-shaped cross section. During installation, the nozzle unit 16a is pushed parallel to a main direction of extent of the coupling element 28a onto the wiper arm adapter 30a. The main direction of extent of the coupling element 28a extends substantially parallel to a main direction of extent of the wiper rod 26a or to the main direction of extent 50a of the wiper arm 12a (FIGS. 8, 9 and 10).

Figure 7:
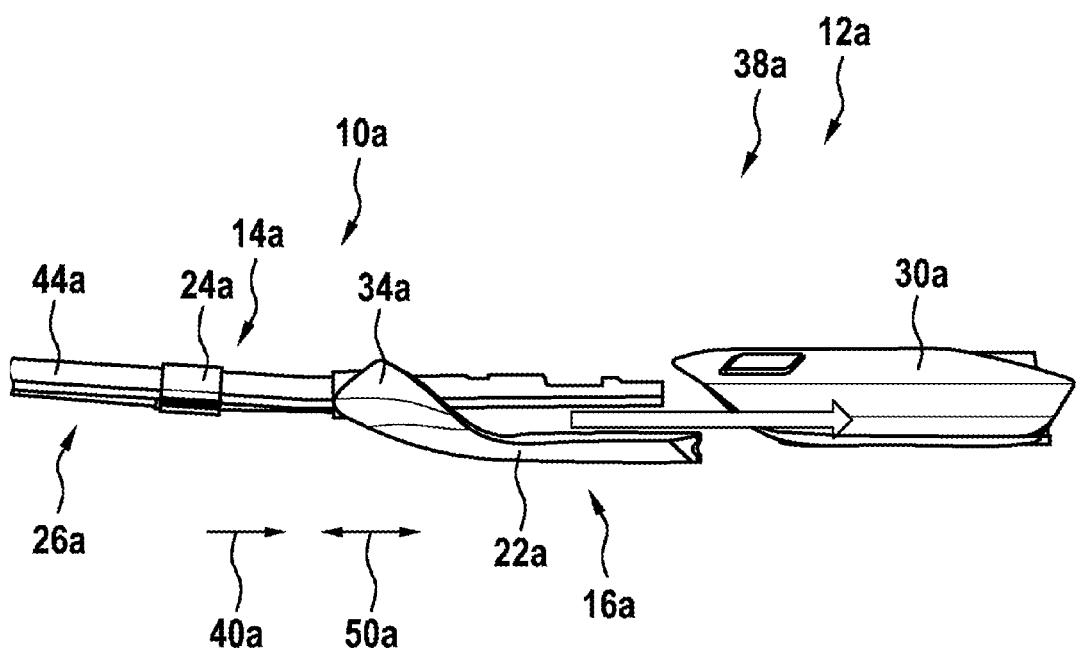
FIG. 7 shows a partial detail of the system comprising the wiper arm and comprising the wiper arm spraying device according to the invention in a schematic exploded illustration.

Furthermore, the nozzle unit 16a has at least one further coupling element 34a which is provided for coupling the nozzle unit 16a to a wiper rod 26a of the wiper arm 12a. The further coupling element 34a is formed by a clip. The further coupling element 34a is formed by a C-shaped clip which is provided for engaging around the wiper rod 26a of the wiper arm 12a. For this purpose, the further coupling element 34a forms a receiving region for receiving the wiper rod 26a. The further coupling element 34a is provided for coupling to the second wiper arm segment 44a. The further coupling element 34a of the nozzle unit 16a is formed integrally with the housing 22a of the nozzle unit 16a (FIGS. 7 and 9).

During installation of the system 38a, in a first step the wiper arm spraying device 10a is fastened to the wiper rod 26a. For this purpose, the valve unit 14a is fastened to the wiper rod 26a by means of the coupling element 24a and the nozzle unit 16a is fastened to the wiper rod 26a by means of the further coupling element 34a. Subsequently, in a further step, the wiper arm adapter 30a is pushed onto the wiper rod 26a. The wiper arm adapter 30a latches here by way of example to the wiper rod 26a. During installation of the wiper arm adapter 30a, the nozzle unit 16a is simultaneously coupled to the wiper arm adapter 30a by means of the coupling element 28a. For this purpose, a coupling direction of the wiper arm adapter 30a to the wiper rod 26a corresponds to a coupling direction of the coupling element 28a to the wiper arm adapter 30a (FIG. 7).

Figure 11:
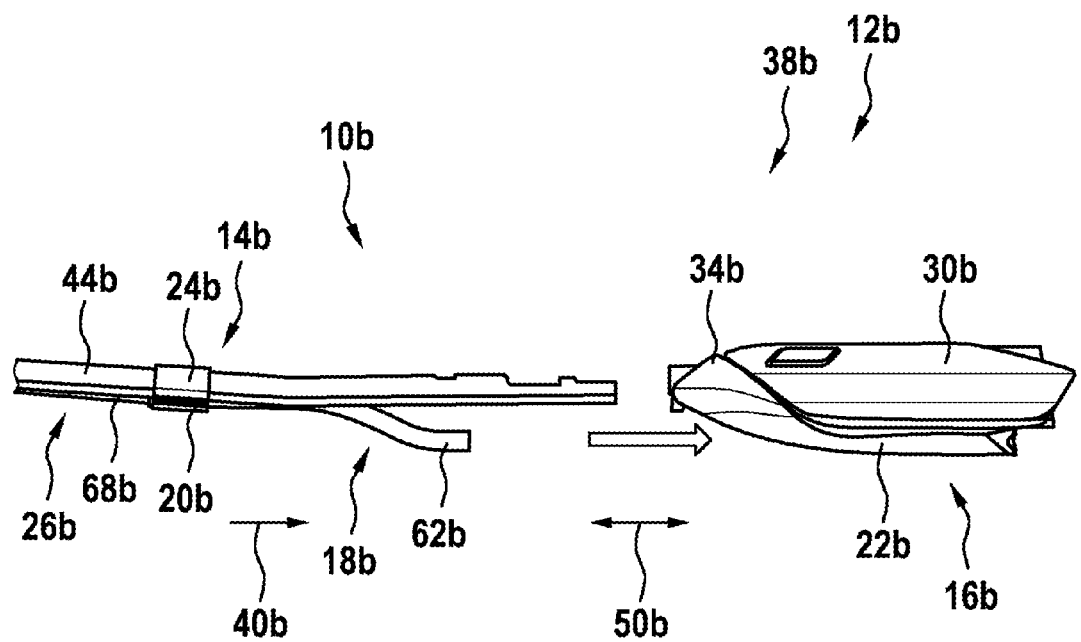
FIG. 11 shows a partial detail of an alternative system comprising a wiper arm and comprising an alternative wiper arm spraying device according to the invention in a schematic exploded illustration.

FIG. 11 shows a further exemplary embodiment of the invention. The descriptions below are essentially restricted to the differences between the exemplary embodiments, wherein, with regard to components, features and functions which remain the same, reference may be made to the description of the exemplary embodiment of FIGS. 1 to 10. To differentiate between the exemplary embodiments, the letter a in the reference signs of the exemplary embodiment in FIGS. 1 to 10 is replaced by the letter b in the reference signs of the exemplary embodiment of FIG. 11. With regard to identically denoted components, in particular with regard to components having the same reference signs, reference can in principle also be made to the drawings and/or the description of the exemplary embodiment of FIGS. 1 to 10.

FIG. 11 shows a partial detail of a system 38b comprising a wiper arm 12b and comprising a wiper arm spraying device 10b. The wiper arm spraying device 10b is provided for cleaning the vehicle window. Furthermore, the wiper arm spraying device 10b is provided for coupling to the wiper arm 12b. The wiper arm spraying device 10b has a valve unit 14b. Furthermore, the wiper arm spraying device 10b has a nozzle unit 16b.

The nozzle unit 16b is provided for directly applying wiper fluid to a vehicle window. The nozzle unit 16b furthermore has a housing 22b in which nozzles are received. A housing 20b of the valve unit 14b is formed separately from the housing 22b of the nozzle unit 16b. The nozzle unit 16b of the wiper arm spraying device 10b is formed integrally with a wiper arm adapter 30b of the wiper arm 12b. The nozzle unit 16b of the wiper arm spraying device 10b is fixedly connected to the wiper arm adapter 30b of the wiper arm 12b.

Furthermore, the nozzle unit 16b has at least one further coupling element 34b which is provided for coupling the nozzle unit 16b to a wiper rod 26b of the wiper arm 12b. The further coupling element 34b is formed by a clip. The further coupling element 34b is formed by a C-shaped clip which is provided for engaging around the wiper rod 26b of the wiper arm 12b. For this purpose, the further coupling element 34b forms a receiving region for receiving the wiper rod 26b. The further coupling element 34b is provided for coupling to the second wiper arm segment 44b. The further coupling element 34b of the nozzle unit 16b is formed integrally with the housing 22b of the nozzle unit 16b.

During installation of the system 38b, in a first step part of the wiper arm spraying device 10b is fastened to the wiper rod 26b. For this purpose, the valve unit 14b is fastened together with the wiper arm hose unit 18b to the wiper rod 26b by means of the coupling element 24b. Subsequently, in a further step, the wiper arm adapter 30b is pushed together with the nozzle unit 16a onto the wiper rod 26b. The wiper arm adapter 30b latches in the process by way of example to the wiper rod 26b. Furthermore, the wiper arm hose unit 18b is automatically coupled here to the nozzle unit 16a. The wiper arm hose unit 62b is coupled at an end facing away from the valve unit 14b to the nozzle unit 16b.

What is claimed is:

1. A wiper arm spraying device (10a; 10b) configured to be coupled to a wiper arm (12a; 12b), the wiper arm spraying device comprising a valve unit (14a; 14b) and a nozzle unit (16a), wherein the valve unit (14a; 14b) is configured to supply the nozzle unit (16a) with wiper fluid and the nozzle unit (16a) is configured to apply the wiper fluid to a vehicle window, wherein the valve unit (14a; 14b) is configured to be integrated in a wiper arm hose unit (18a; 18b), wherein the valve unit (14a; 14b) has a first housing (20a; 20b) and the nozzle unit (16a) has a second housing (22a; 22b), wherein the second housing (22a; 22b) of the nozzle unit (16a) is formed separately from the first housing (20a; 20b) of the valve unit (14a; 14b), wherein the nozzle unit (16a) has a first coupling element (28a) which is configured to couple the nozzle unit (16a) to a wiper arm adapter (30a) of the wiper arm (12a), and wherein the nozzle unit (16a) has a second coupling element (34a; 34b) which is configured to couple the nozzle unit (16a) directly to a wiper rod (26a; 26b) of the wiper arm (12a; 12b).

2. The wiper arm spraying device as claimed in claim 1, wherein the valve unit (14a; 14b) has a coupling element (24a) which is configured to couple the valve unit (14a; 14b) to the wiper rod (26a; 26b) of the wiper arm (12a; 12b).

3. The wiper arm spraying device as claimed in claim 2, wherein the coupling element (24a) of the valve unit (14a; 14b) is formed integrally with the first housing (20a; 20b) of the valve unit (14a; 14b).

4. The wiper arm spraying device as claimed in claim 1, wherein the first coupling element (28a) of the nozzle unit (16a) is formed by a fixing rib which is configured to engage in a fixing groove (32a) of the wiper arm adapter (30a) of the wiper arm (12a).

5. The wiper arm spraying device as claimed in claim 1, wherein the valve unit (14a; 14b) comprises at least one valve (36a) in the form of a duckbill valve.

6. A system (38a; 38b) comprising a wiper arm (12a; 12b) having a wiper arm adapter (30a), and the wiper arm spraying device as claimed in claim 1 coupled to the wiper arm (12a; 12b).

7. The system as claimed in claim 6, wherein a shape of the second housing (22a) of the nozzle unit (16a) of the wiper arm spraying device (10a) at least partially merges into a shape of the wiper arm adapter (30a) of the wiper arm (12a).

8. The system as claimed in claim 6, wherein the valve unit (14a; 14b) of the wiper arm spraying device (10a; 10b) is arranged upstream of the wiper arm adapter (30a; 30b) in a flow direction (40a; 40b).

9. The system as claimed in claim 8, wherein a minimum distance between the valve unit (14a; 14b) and the wiper arm adapter (30a; 30b) is at least 1 cm.

10. The wiper arm spraying device as claimed in 1, further comprising the hose unit (18a; 18b), wherein the valve unit (14a; 14b) is integrated in the wiper arm hose unit (18a; 18b).

11. The wiper arm spraying device as claimed in claim 1, wherein the valve unit (14a; 14b) comprises a valve (36a), wherein at least a portion of the valve is disposed inside the first housing (20a; 20b) of the valve unit (14a, 14b).

12. The wiper arm spraying device as claimed in claim 11, wherein the first housing (20a; 20b) of the valve unit (14a, 14b) has a connection piece (60a) forming an outlet side of the valve unit (14a; 14b).

13. The wiper arm spraying device as claimed in claim 11, wherein the valve unit (14a; 14b) further includes an end cap (64a) coupled to the valve (36a).

14. The wiper arm spraying device as claimed in claim 13, wherein the end cap (64a) includes a connection piece (66a) forming an inlet side of the valve unit (14a; 14b).

15. The wiper arm spraying device as claimed in claim 13, wherein a portion of the end cap is disposed within the first housing (20a; 20b) of the valve unit (14a, 14b).

16. The wiper arm spraying device as claimed in claim 1, wherein the first coupling element (28a) is configured to couple the nozzle unit (16a) directly to the wiper arm adapter (30a) of the wiper arm (12a; 12b).

17. The wiper arm spraying device as claimed in claim 1, wherein the nozzle unit (16a) is a single piece element.

18. The wiper arm spraying device as claimed in claim 17, wherein the first coupling element (28a) is disposed at a first end of the single piece nozzle unit (16a) and the second coupling element (34a; 34b) is disposed at a second, opposite end of the single piece nozzle unit (16a), and wherein the single piece nozzle unit (16a) additionally includes a nozzle opening at the first end.

* * * * *